(12) United States Patent
Bohn (10) Patent No.: US 6,380,529 B1
(45) Date of Patent: Apr. 30, 2002

(54) POSITION SENSING DEVICE HAVING A MOVABLE PHOTOSENSING ELEMENT

(75) Inventor: David D. Bohn, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/408,357

(22) Filed: Sep. 29, 1999

(51) Int. Cl.[7] .............................................. H01L 27/00
(52) U.S. Cl. ................................. 250/208.1; 358/473
(58) Field of Search .............................. 250/208.1, 206, 250/206.1, 559.32, 559.29, 221, 201.1, 234, 235, 203.1; 382/313; 358/472, 473; 356/615, 622, 139.04–139.08

(56) References Cited

U.S. PATENT DOCUMENTS

| | | | |
|---|---|---|---|
| 4,574,191 A | * 3/1986 | Conrad | 250/203.1 |
| 5,552,597 A | 9/1996 | McConica | 250/234 |
| 5,578,813 A | 11/1996 | Allen et al. | 250/208.1 |
| 5,644,139 A | 7/1997 | Allen et al. | 250/557 |
| 5,646,394 A | 7/1997 | Syeinle et al. | 250/208.1 |
| 5,646,402 A | 7/1997 | Khovaylo et al. | 250/234 |
| 5,691,544 A | * 11/1997 | Stern et al. | 250/559.29 |
| 5,723,859 A | 3/1998 | Kerschner et al. | 250/234 |

* cited by examiner

Primary Examiner—Que T. Le
Assistant Examiner—Thanh X. Luu (57) ABSTRACT

A position sensing device for determining the position of an object to which the position sensing device is attached is disclosed herein. The position sensing device may comprise a substrate, an actuator and a two-dimensional photosensor array wherein the substrate is attached to the object. The actuator may have a first portion and a second portion wherein the actuator first portion is attached to the substrate and wherein the actuator second portion is movably mounted to the actuator first portion along a first axis. The two-dimensional photosensor array may be attached to the actuator second portion. The position sensing device determines the position of the object by electronically and mechanically tracking distinct features on the surface. The electronic component of the tracking involves determining the position of the distinct features relative to the two-dimensional photosensor array. The mechanical component of the tracking involves moving the two-dimensional photosensor array to track the distinct features.

4 Claims, 10 Drawing Sheets

POSITION SENSING DEVICE HAVING A MOVABLE PHOTOSENSING ELEMENT

FIELD OF THE INVENTION

The present invention relates to position sensing devices and, more particularly, to a scanning device comprising a position sensing device having a movable photosensing element.

BACKGROUND OF THE INVENTION

Hand-held scanning devices are portable imaging devices that generate machine-readable image data (sometimes referred to herein simply as image data) representing an image of an object. Generating image data representative of an object is sometimes referred to as "imaging" or "scanning" the object. Some scanning devices generate image data representing a narrow "scan line" portion of the object being imaged. During the Ad imaging process, the scanning device is moved relative to the object being imaged. As the scanning device is moved relative to the object, the scanning device generates image data representing a plurality of sequential scan line portions of the image of the object. The image of the object is, accordingly, represented by the image data of the cumulation of sequential scan lines similar to the image of the object represented by a conventional video display.

The image of the scan line portion of the object is focused onto a linear array of photodetector elements (sometimes referred to herein simply as photodetectors). The photodetectors may, as an example, be mounted to a plurality of linearly arranged electronic segments such as contact image sensors as are known in the art. The photodetectors may also be etched into a single semiconductor as is common in a charge-coupled device. The individual photodetectors generate image data representing discrete portions of the image of the scan line portion of the object. The image data may, as an example, be represented by a series of voltages, wherein a relatively high voltage represents a relatively high intensity of light received by a photodetector and a relatively low voltage represents a relatively low light intensity received by a photodetector.

The image data generated by the photodetectors is transmitted to a processor. One of the functions of the a processor is to create a data base or similar electronic structure that indicates the positions of the scan lines relative to the positions on the object from where the scan lines were generated. Alternatively, the data base may indicate the locations of the scan lines relative to each other. The data stored in the data base and the image data are used by the processor to replicate the image of the object. As an example, in the situation in where the scanning device is generating image data representing a two-dimensional object, such as text located on a sheet of paper, the hand-held scanning device may be moved in any direction on the paper. Accordingly, the scan line portions may be generated from virtually any location on the paper, which leads to the image data representing the image of the object consisting of a plurality of scan line portions that may be skewed over the surface of the paper. In order to accurately replicate the image of the object, the hand held scanning device uses the data stored in the data base to determine the proper placement of the scan line portions of the image of the paper. The processor may then create an electronic image of text printed on the paper by known processing techniques, e.g., stitching software.

Examples of hand-held scanning devices are described in the following United States patents and patent applications, which are all hereby incorporated by reference for all that is disclosed therein: U.S. Pat. No. 5,552,597 of McConica for HAND-HELD SCANNER HAVING ADJUSTABLE LIGHT PATH; U.S. Pat. No. 5,646,394 of Steinle for IMAGING DEVICE WITH BEAM STEERING CAPABILITY; U.S. Pat. No. 5,646,402 of Khovaylo et al. for EXPANDABLE HAND-HELD SCANNING DEVICE; U.S. Pat. No. 5,723,859 of Kerschner et al. for LINE CONTACT HAND-HELD SCANNING DEVICE AND METHOD HAVING A LIGHT PATH SUBSTANTIALLY PERPENDICULAR TO THE ORIENTATION OF THE OBJECT AT A LINE PORTION; Ser. No. 09/120,641 of Sims et al. for HAND HELD SCANNING DEVICE filed on Jul. 29, 1998; and Ser. No. 09/120,637 of Sims et al. for HAND HELD SCANNING DEVICE filed on Jul. 30, 1998.

A problem replicating the image of the object may be encountered if the velocity or position of the scanning device relative to the object becomes unknown during the scanning process. For example, if the scanning device is imaging one thousand scan line portions of the image of the object per second and the scanning device is moving along a single axis at a constant rate of one inch per second relative to the object, each scan line represents one one-thousandth of an inch of the image of the object. If the correct velocity of the scanning device relative to the object has been conveyed to the processor, the processor will create a data base indicating that each scan line represents one one-thousandth of and inch of the image of the object. Alternatively, the processor will indicate that each scan line is located one one-thousandth of an inch from an adjacent scan line. Based on the image data and the data stored in the data base, the processor may accurately replicate the image of the object. If, however, the velocity of the scanning device relative to the object is decreased and the decreased velocity is not conveyed to the processor, the processor will continue to process the image data as though each scan line represents one one-thousandth of an inch of the object. Each scan line, however, will represent less than one one-thousandth of an inch of the object. Accordingly, the image of the object will be compressed. If, on the other hand, the velocity of the scanning device relative to the object is increased and the increased velocity is not conveyed to the processor, the image of the object will be expanded.

Accurately replicating an image of an object when either the velocity or position of the scanning device relative to the object becomes unknown is impossible. If the position or velocity is not known, the processor will not know where the scanning device is located relative to in the object as the scan lines are being generated. Accordingly, the processor will not be able to properly place the scan line portions relative to each other so as to accurately replicate the image of the object. This problem is exacerbated in hand-held scanning devices where the scan lines may be generated from anywhere on the object and are often skewed over the surface of the object.

In order to overcome these problems, scanning devices use position sensors to detect the position of the scanning device relative to the object. The position sensors output position information pertaining to the position of the scanning device relative to the object as the scan line portions of the image of the object are being generated. This position information is conveyed to the processor where it is incorporated into the above-described data base.

In some scanning devices, the position sensor takes the form of an optical sensor which may be rigidly affixed to the scanning device. The optical sensor is used to determine the position of the scanning device relative to the object being scanned. The optical sensor is a two-dimensional array of photodetectors that periodically generates image data from a small two-dimensional area portion of the object being scanned. A processor receives this image data and identifies distinct features in the area portion of the object. In the example where the object is text printed on a sheet of paper, the distinct features may be inherent irregularities in the surface of the paper. The irregularities may, for example, be caused by pulp material used to manufacture the paper.

The positions of these distinct features relative to the optical sensor are stored in a memory device. As the scanning device is moved relative to the object, the positions of these distinct features move relative to the optical sensor. The processor compares the new positions of these distinct features to the positions stored in the memory device. Based on these comparisons, the processor is able to determine the position, direction of movement, and velocity of the optical sensor, and thus, the scanning device, relative to the object. Accordingly, the processor is able to create the above-described data base because the locations of the scan line portions of the image of the object relative to each other may be readily determined.

Some scanning devices have several of these two-dimensional optical sensors rigidly affixed at various positions relative to the linear array of photodetectors. For example, the scanning device may have two optical sensors spaced a distance from each other. The scanning device is able to compare the movement data from each optical sensor to determine the amount of movement, including rotational motion, the scanning device has undergone. As the distance between the optical sensors increases, the accuracy to which the scanning device is able to determine rotational motion increases accordingly.

These optical sensors, however, tend to be some of the more expensive components comprising the scanning device. Two of the factors that influence the cost of an optical sensor are its area and its concentration of photodetectors. The cost of an optical sensor having a larger area or higher concentration of photodetectors is substantially more than an optical sensor having a smaller area or a lesser concentration of photodetectors. The sensitivity of the optical sensor, however, is proportional to its area and its concentration of photodetectors. An optical sensor with a large area and a high concentration of photodetectors is able to determine position with much greater accuracy than an optical sensor with a small area and a low concentration of photodetectors. Accordingly, in order to accurately determine the position of a hand-held scanning device, optical sensors having large areas and high concentrations of photodetectors are preferred. These optical sensors, however, substantially increase the cost of the hand-held scanning device.

Therefore, a need exists for a hand-held scanning device that is able to accurately determine its position without a substantial increase of the cost of the scanning device.

SUMMARY OF THE INVENTION

A position sensing device for determining the position of an object relative to a surface is disclosed herein. The position sensing device may comprise a substrate associated with the object; an actuator having a first portion and a second portion wherein the first portion is attached to the substrate and wherein the second portion is movably mounted to the first portion; and a two-dimensional photosensor array attached to the actuator second portion. A light path may extend between a plane and the two-dimensional photosensor array and a lens may be positioned in the light path. A processor may be electrically connected to the actuator and the two-dimensional photosensor array.

The two-dimensional photosensor array may have a two-dimensional array of photodetectors mounted to a surface. The photodetectors generate machine-readable image data representative of an image focused onto the photodetectors. The two-dimensional photosensor array is generally smaller than those used in conventional scanning devices. The concentration of photodetectors on the surface may, however, be substantially equivalent to the concentration of photodetectors used in conventional scanning devices.

The two-dimensional photosensor array generates image data representative of a two-dimensional area portion of the surface as the object is moved relative to the surface. The processor receives the image data and identifies the locations of distinct features in the image of the area portion. of the surface relative to the two-dimensional photosensor array. As the object moves relative to the surface, the images of the distinct features move relative to the two-dimensional photosensor array. During this period, the processor instructs the actuator to move the two-dimensional photosensor array to track the distinct features. By determining the movement of the images of the distinct features relative to the two-dimensional photosensor array and the amount of movement the actuator moves the two-dimensional photosensor array, the processor calculates the displacement of the object relative to the surface. The processor may then determine the velocity and position of the object relative to the surface.

DETAILED DESCRIPTION OF THE INVENTION

FIGS. 1 through 7, in general, illustrate a position sensing device 200 comprising: a substrate 210; a first portion 370 and a second portion 372 wherein the first portion 370 is attached to the substrate 210 and wherein the second portion 372 is movably mounted to the first portion 370 along a first axis; a two-dimensional photosensor array 230 attached to the second portion 372; a light path 260 extending between a plane and the two-dimensional photosensor array 230; and a lens 250 positioned in the light path 260.

FIGS. 1 through 7 also, in general, illustrate a position sensing device 200 comprising: a substrate 210; a two-dimensional photosensor array 230 attached to the substrate 210; a light path 260 extending between the two-dimensional photosensor array 230 and a plane; a first portion 370 and a second portion 372 wherein the first portion 372 is attached to the substrate 210 and wherein the second portion 372 is movably mounted to the first portion 370 along a first axis; a lens 250 attached to the second portion 372 and positioned in the light path 260.

FIGS. 1 through 7 also, in general, illustrate a method of determining the position of an object 100 relative to a surface 182. The method comprises: providing a two-dimensional photosensor array 230 movably associated with the object 100; directing light from a focal plane portion 190 of the surface 182 to the two-dimensional photosensor array 230; causing relative movement between the surface 182 and the object 100; maintaining a light path 260 between the focal plane portion 190 of surface 182 and the two-dimensional photosensor array 230 by moving the two-dimensional photosensor array 230; and performing an analysis of the movement of the two-dimensional photosensor array 230 to determine the displacement of the object 100 relative to the surface 182.

FIGS. 1 through 7 also, in general, illustrate a method of determining the position of an object 100 relative to a surface 182. The method comprises: providing a two-dimensional photosensor array 230; providing a lens 250 associated with the two-dimensional photosensor array 230; directing light from a focal plane portion 190 of the surface 182, through the lens 250, and onto the two-dimensional photosensor array 230; causing relative movement between the surface 182 and object 100; maintaining a light path 260 between the focal plane portion 190 of surface 182 and the two-dimensional photosensor array 230 by moving the lens 250 relative to two-dimensional photosensor array 230; and performing an analysis of the movement of the lens 250 relative to the two-dimensional photosensor array 230 to determine the displacement of the object 100 relative to the surface 182.

FIGS. 1 through 7 also, in general, illustrate a position sensing device 200 for determining the position of an object 100 relative to a surface 182. The device 200 comprises: a substrate 210 associated with the object 100; a photodetector means 230 associated with the substrate 210 for converting an image of a two-dimensional portion 190 of a surface 182 to machine-readable data; a light path 260 extending between a planar portion of the surface 182 and the photodetector means 230; and a means 300 for moving the photodetector means 230 relative to the substrate 210 to maintain the light path 260 between the planar portion of the surface 182 and the photodetector means 230 as the object 100 is moved relative to the surface 182.

Figure 1:
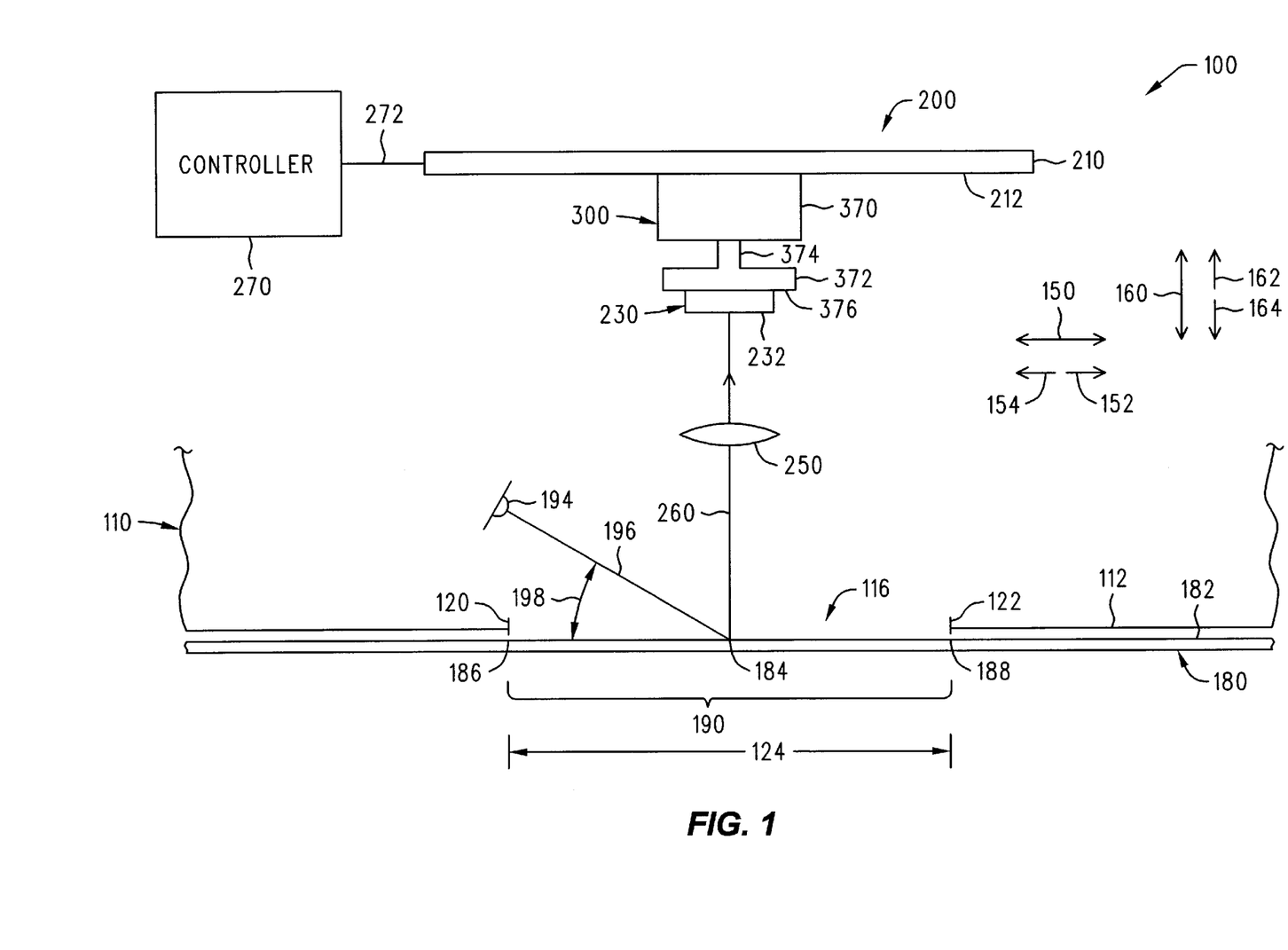
FIG. 1 is a side view of a position sensing device having a movable photosensor incorporated into a scanning device.

Referring to FIG. 1, a position sensing device 200 for determining the position of an object relative to a surface is disclosed herein. The position sensing device 200 disclosed herein is described as being associated with a scanning device 100 to determine the position of the scanning device 100 relative to a surface 182 of a sheet of paper 180. Accordingly, for the purposes of this description, the object is the scanning device 100 and the surface is the surface 182 of the sheet of paper 180. It is to be understood, however, that the position sensing device 200 may be used in conjunction with devices other than scanning devices to determine the positions of these devices relative to surfaces other than surfaces of sheets of paper. Examples of such devices include facsimile machines and copy machines.

The following description is a summary of the position sensing device 200 followed by a more detailed description of the position sensing device 200 incorporated into the scanning device 100. The position sensing device 200 is a device that determines the position of an object to which the position sensing device 200 is attached relative to a surface 182. The position sensing device 200 may have a two-dimensional photosensor assembly 230 electrically connected to a processor 270. The two-dimensional photosensor assembly 230 generates machine-readable image data (sometimes referred to herein simply as image data) of an image of an area portion 190 of the surface 182. The image data may be output to the processor 270 in a conventional manner.

The processor 270 identifies distinct features in the image of the area portion 190 of the surface 182 and determines the locations of these distinct features relative to the two-dimensional photosensor assembly 230. As the position sensing device 200 is moved relative to the surface 182, the locations of the distinct features relative to the two-dimensional photosensor assembly 230 move accordingly. The processor 270 measures the movement of the distinct features relative to the two-dimensional photosensor assembly 230 and, based on this measurement, is able to determine the rate and direction of movement of the position sensing device 200 relative to the surface 182. The processor may further analyze the rate and direction of movement of the position sensing device 200 to determine the position of the position sensing device 200 relative to the surface 182. The processor 270 then readily determines the position, rate of movement, and direction of movement of the scanning device 100 relative to the surface 182. Examples of determining the movement of an object by imaging distinct features of the surface of the object are further described in the following United States patents: U.S. Pat. No. 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NON-LINEAR MOVEMENT, which are both hereby incorporated by reference for all that is disclosed therein.

In a conventional position sensing device, distinct features on the surface are imaged as the positioning sensing device moves relative to the surface. The distinct features imaged by the position sensing device are typically very minute and pass by the imaging area of the positioning sensing device at a relatively high rate of speed. For example, the distinct features may be irregularities on the surface of a sheet of paper caused by pulp material in the paper and the position sensing device may be associated with a hand-held scanning device that is imaging the surface of the paper. A hand-held scanning device is a relatively small device that is moved at a relatively high rate of speed across a sheet of paper. Accordingly, irregularities caused by the pulp in the paper will pass by the position sensing device in the hand-held scanning device at a relatively high velocity.

In order to adequately image these minute distinct features on the surface of a sheet of paper, the two-dimensional photosensor assembly used in the conventional position sensing device has a high concentration of photodetectors located over a relatively large area. The high concentration of photodetectors facilitates imaging the minute distinct features and the large area facilitates imaging the distinct features for an extended period as the position sensing device is moved rapidly relative to the surface.

This large area of highly concentrated photodetectors, however, tends to be costly to manufacture and, thus, represents a significant portion. of the cost of the conventional position sensing device. This high cost is typically passed on to the device to which the conventional position sensing device is attached. In the situation where the position sensing device is used in a scanning device, the high cost of the position sensing device increases the cost of the scanning device. This cost is further increased as more position sensing devices are used in the scanning device.

The position sensing device 200 disclosed herein overcomes the aforementioned problems associated with conventional position sensing devices by the use of a movable two-dimensional photosensor assembly 230. The two-dimensional photosensor assembly 230 may have a high concentration of photodetectors placed over a smaller area than the area of a two-dimensional photosensor assembly used in a conventional position sensing device. The position sensing device 200 is able to use the two-dimensional photosensor assembly 230 having a reduced area because the two-dimensional photosensor assembly 230 is movable relative to the position sensing device 200. The two-dimensional photosensor assembly 230 may then mechanically track the distinct features on the surface 182 as the position sensing device 200 is moved relative to the surface 182. Accordingly, the two-dimensional photosensor assembly 230 may be relatively small. As will be described below, an actuator 300 may be included in the position sensing device 200 to move the two-dimensional photosensor assembly 230. The cost of the position sensing device 200 disclosed herein may be reduced relative to a conventional position sensing device because a smaller area and fewer photodetectors are required on the two-dimensional photosensor assembly 230.

Figure 8:
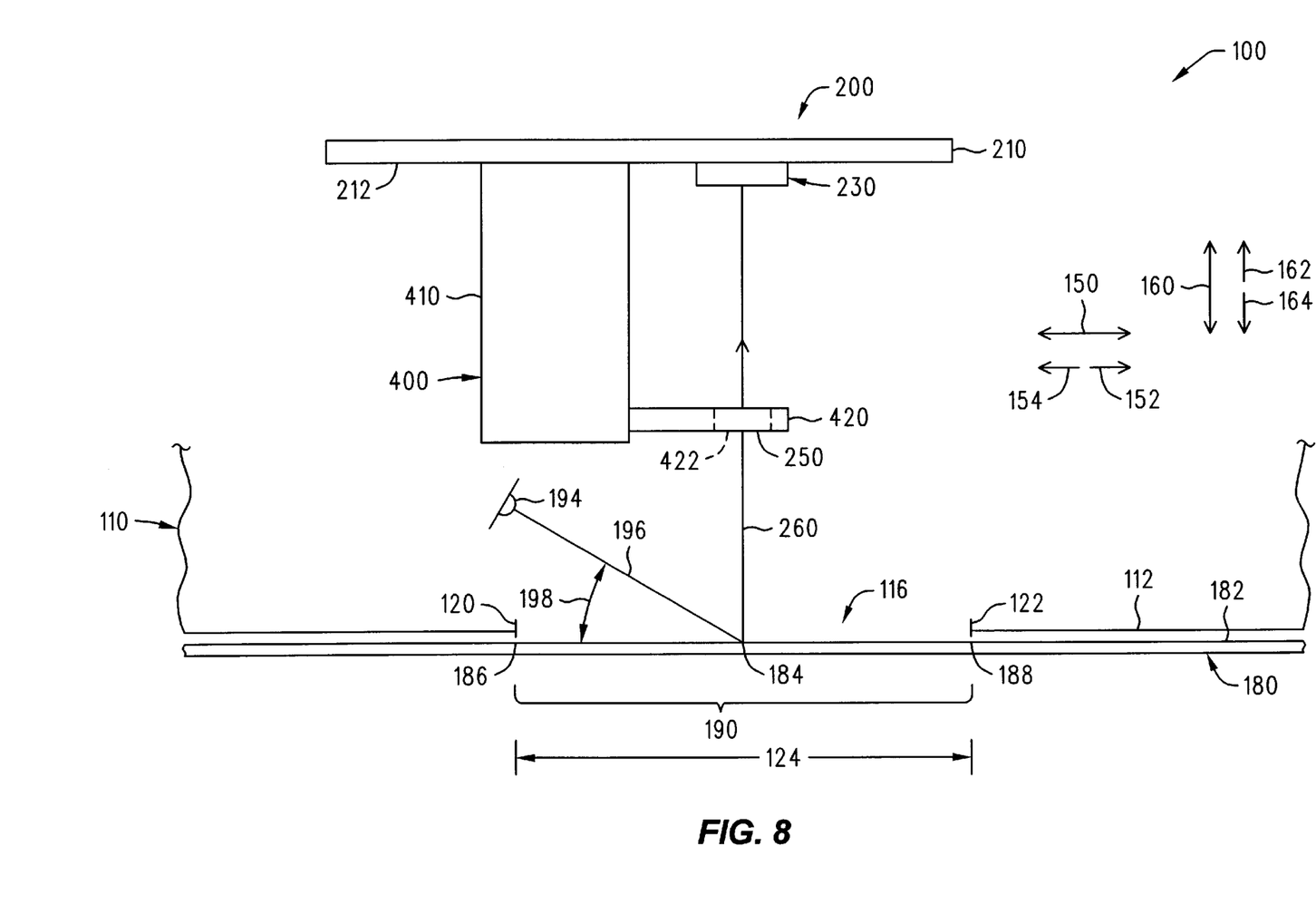
FIG. 8 is a side view of a position sensing device having a movable lens incorporated into a scanning device.

Referring to FIG. 8, an embodiment of the position sensing device 200 is disclosed herein having a movable lens 250 located between the two-dimensional photosensor assembly 230 and the surface 182. In this embodiment, the two-dimensional photosensor assembly 230 is not moveable relative to the position sensing device 200, however, the lens 250 is movable relative to the two-dimensional photosensor assembly 230. Specifically, the lens 250 moves relative to the two-dimensional photosensor assembly 230 to direct images of the distinct features on the surface 182 onto the two-dimensional photosensor assembly 230.

Figure 2:
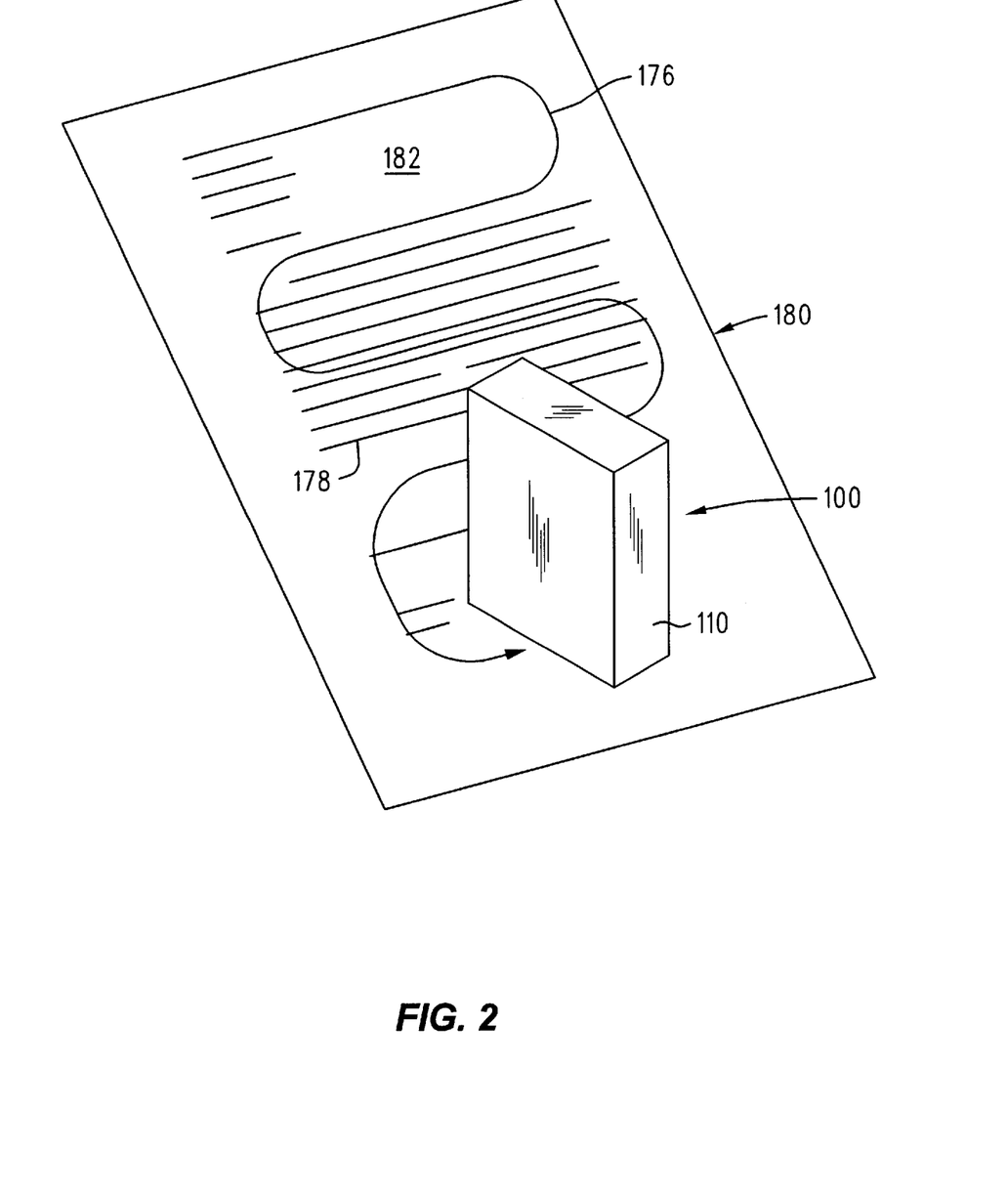
FIG. 2 is a top perspective view of the scanning device of FIG. 1 scanning a sheet of paper.

Having summarily described the position sensing device 200, it will now be described in greater detail. Referring to FIG. 2, the scanning device 100 is illustrated imaging the surface 182 of the sheet of paper 180. During the scanning operation, the scanning device 100 may generate image data representative of text 178 printed on the surface 182 of the sheet of paper 180 in a conventional manner. The scanning device 100 may be manually moved by an operator along a meandering path 176 over the surface 182 of the sheet of paper 180 during the scanning operation. As the scanning device 100 passes over the text 178, the scanning device 100 converts the text to image data. The scanning device 100 may, for example, be configured as a conventional hand-held scanning device, such as the hand-held scanning devices described in the United States patents and patent applications: U.S. Pat. No. 5,552,597 of McConica; U.S. Pat. No. 5,646,394 of Steinle; U.S. Pat. No. 5,646,402 of Khovaylo et al.; U.S. Pat. No. 5,723,859 of Kerschner et al.; Ser. No. 09/120,641 of Sims et al.; and Ser. No. 09/120,637 of Sims et al.; which have all been previously referenced.

Referring again to FIG. 1, the scanning device 100 may have a housing 110 wherein the position sensing device 200 is located within the housing 110. The housing 110 may have a substantially planer lower side 112. An aperture 116 may be formed in the lower side 112. The aperture 116 may have a first end 120 and a second end 122 separated by a length 124. An area portion 190 of the surface 182 may be located beneath the aperture 116. The area portion 190 may be bounded by a first point 186 and a second point 188 wherein the first point 186 is located below the first end 120 of the aperture 116 and the second point 188 is located beneath the second end 122 of the aperture 116. It should be noted that the points 186 and 188 are lines on the surface 182, however, they appear as points in the side view of FIG. 1. A light path 260 may extend between a point 184 on the surface 182, through the aperture 116 and to the position sensing device 200. When the scanning device 100 is in use, a beam of light, not shown, may extend between an area portion of the surface 182 and the two-dimensional photosensor assembly 230 along the light path 260.

A light source 194 may be located in the housing 110. The light source 194 may, as an example, be a light-emitting diode. An incident light path 196 may extend from the light source 194, through the aperture 116 and to the point 184 on the area portion 190. As will be described below, the light source 194 may serve to emit light to illuminate the area portion 190.

The position sensing device 200 may have a substrate 210, a two-dimensional photosensor assembly 230, a controller 270, and the lens 250. The substrate 210 may, as an example, be a conventional rigid printed circuit board. The substrate 210 may have a surface 212 wherein other components comprising the position sensing device 200 may be mounted to the surface 212. The substrate 210 may have a plurality of lands that serve to conduct electricity between components mounted to the substrate 210. The substrate 210 may be rigidly attached to the housing 110 so as to be substantially parallel to the lower side 112.

An embodiment of the actuator 300 is illustrated in FIG. 1. The actuator 300 may have a control portion 370 and an actuating portion 372, which are sometimes referred to herein as a first portion and second portion respectively. The control portion 370 and the actuating portion 372 may be connected by a lever mechanism 374. The lever mechanism 374 may serve to move the control portion 370 relative to the actuating portion 372. The actuating portion 372 may have a surface 376 to which the two-dimensional photosensor assembly 230 is attached. As will be described below, the control portion 370 may serve to move the actuating portion 372 and, thus, the two-dimensional photosensor assembly 230 via moving the lever mechanism 374.

Figure 3:
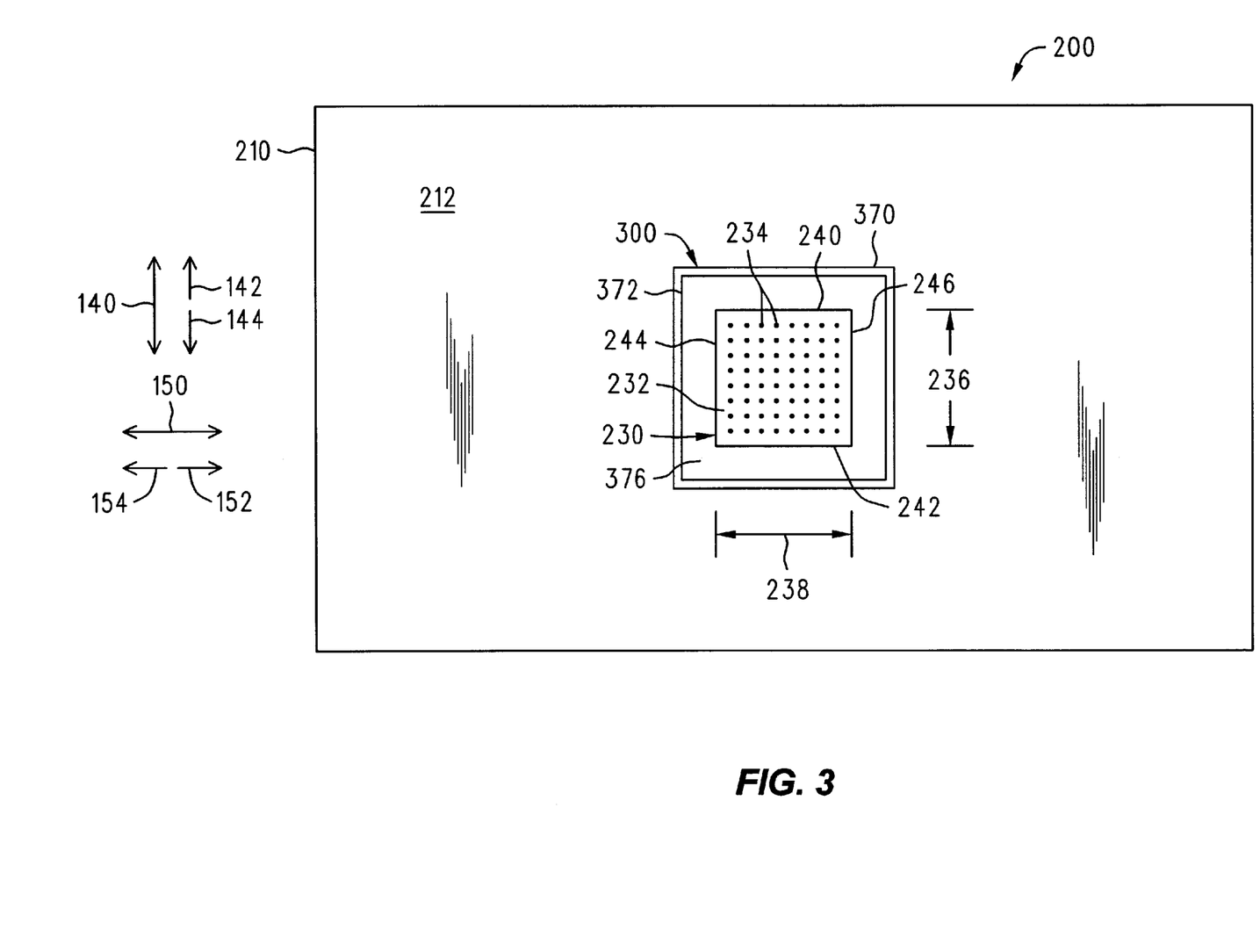
FIG. 3 is a top view of the position sensing device of FIG. 1.

The control portion 370 may be rigidly attached to the surface 212 of the substrate 210. Referring to FIG. 3, which is a view of the position sensing device 200 as viewed from the lower side 112, FIG. 1, of the housing 110, the control portion 370 may be an electromechanical device that is capable of moving the actuating portion 372. Specifically, the control portion 370 may move the actuating portion 372 in a plane that is parallel to a plane defined by the surface 212 of the substrate 210. The actuator 300 may move the actuating portion 372 and, thus, the two-dimensional photosensor assembly 230 in a y-direction 140 and an x-direction 150 wherein the y-direction 140 and the x-direction 150 are perpendicular to one another. The y-direction 140 may be further defined as having a positive y-direction 142 and a negative y-direction 144. The x-direction 150 may be further defined as having a positive x-direction 152 and a negative x-direction 154. The control portion 370 may, as an example, use a conventional piezoelectric or piezoceramic device to control the movement of the actuating portion 372. Alternatively, the control portion 370 may use a system of servos to control the actuating portion 372. In yet another embodiment, the control portion 370 may use electromagnetic forces to control the movement of the actuating portion 372 in a similar manner as the objective lens in a compact disc drive is moved relative to a compact disc.

In the actuator 300 illustrated herein, the control portion 370 moves the actuating portion 372 to a specific position in the y-direction 140 and the x-direction 150 depending on voltages received by the control portion 370. Spring forces may bias the lever mechanism 374 to a central location in the y-direction 140 and the x-direction 150. Application of voltages to the control portion 370 may cause the lever mechanism 374 to move in the y-direction 140 and the x-direction 150 against the spring forces from the central location as described below. For example, the application of a voltage to the control portion 370 may cause the control portion 370 to move the actuating portion 372 to a specific location in a direction, e.g., the positive y-direction 142. The application of the reverse polarity may cause the control portion 370 to move the actuating portion 372 to a specific location in the reverse direction, e.g., the negative y-direction 144. Alternatively, the application of a voltage to the control portion 370 may cause the actuating portion 372 to move in a direction and at a rate that corresponds to the voltage applied to the control portion 370.

Referring again to FIG. 1, the control portion 370 of the actuator 300 may be electrically connected to the substrate 210. The control portion 370 may have the voltages applied to it via the lands in the substrate 210. As described above, the substrate 210 may be electrically connected to the processor 270, thus, the processor 270 may apply the voltages to the control portion 370 via the lands in the substrate 210.

Figure 4:
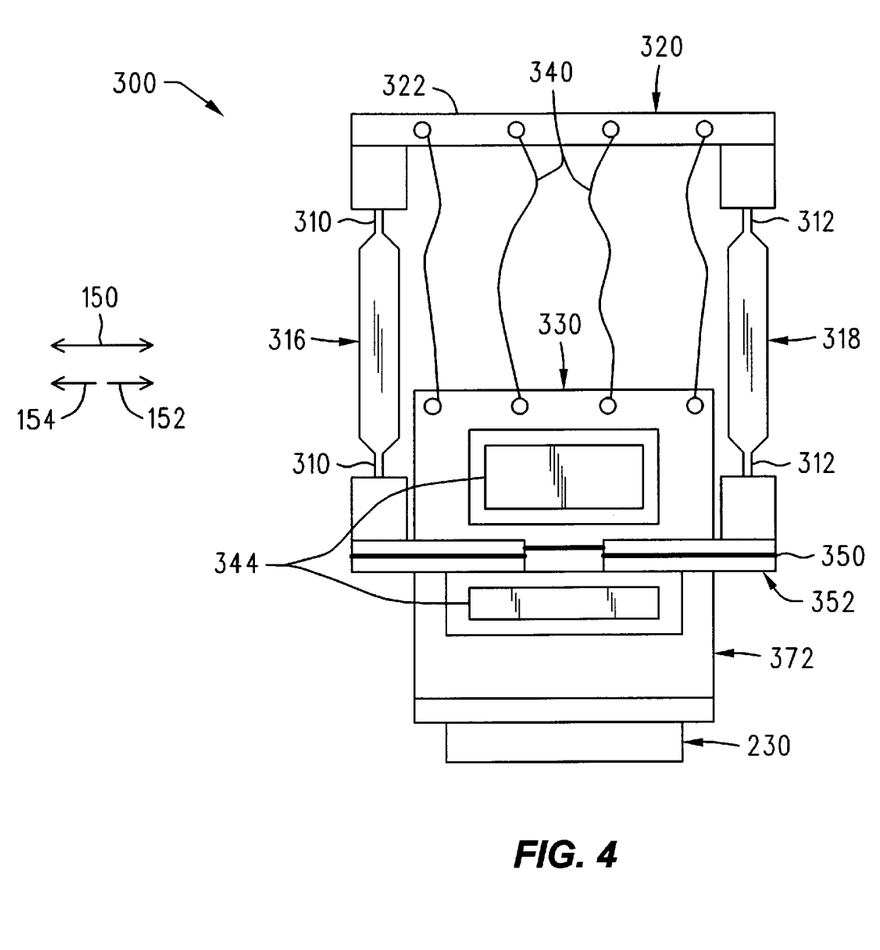
FIG. 4 is a side view of an embodiment of an actuator used in the position sensing device of FIG. 1.
Figure 5:
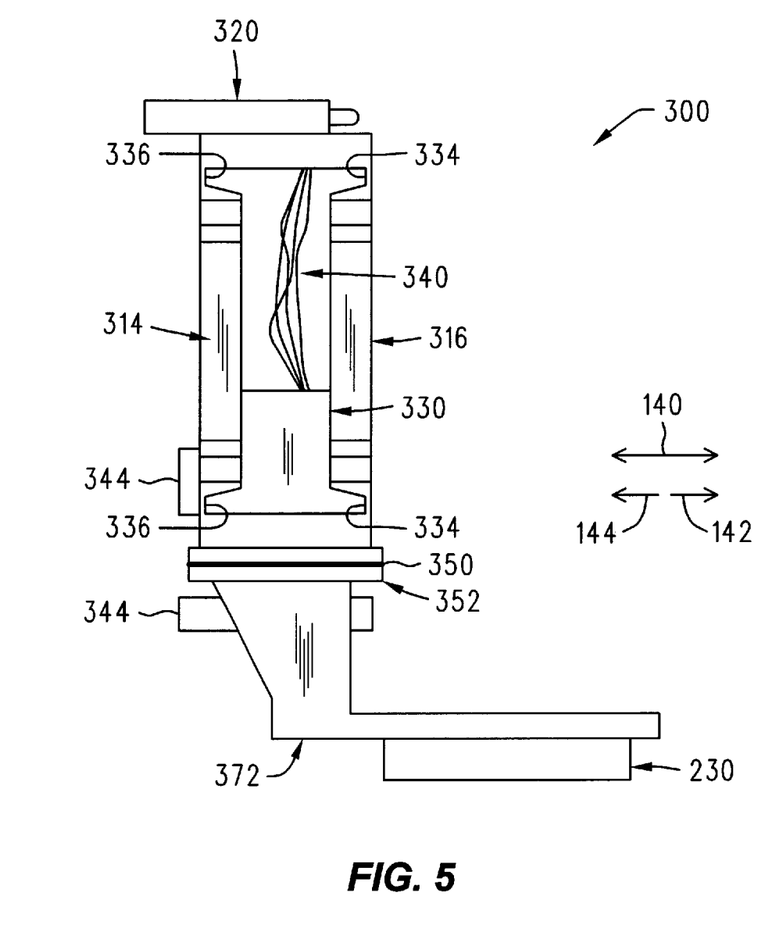
FIG. 5 is another side view of the actuator of FIG. 4.

An example of an actuator 300 is illustrated in FIGS. 4 and 5. The actuator 300 illustrated in FIGS. 4 and 5 is similar to an actuator used to move an objective lens in an optical disc drive. Referring to FIG. 4, which is a front view of the actuator 300, the actuator 300 is an electro mechanical device that moves the two-dimensional photosensor assembly 230 to predetermined positions.

The actuator 300 may have a mounting portion 320 attached to a left bracket 316 and a right bracket 318. The mounting portion 320 may have a mounting surface 322 that may serve to mount the actuator 300 to a chassis within the scanning device 100. As will described below, the left bracket 316 and the right bracket 318 may actually comprise two structural components each. The left bracket 316 may have two left hinges 310. Likewise, the right bracket 318 may have two right hinges 312. The left hinges 310 and the right hinges 312 may ultimately serve to allow relative movement in the x-direction 150 between the mounting portion 320 and the two-dimensional photosensor assembly 230. The use of two hinges allows more of a linear movement of the two-dimensional photosensor assembly 230 rather than a rotational movement. Both the left bracket 316 and the right bracket 318 may be attached to a front portion 352. The front portion 352, in turn, may be attached to the actuating portion 372. As was described above, the two-dimensional photosensor assembly 230 may be attached to the actuating portion 372.

Electric current is required to move the two-dimensional photosensor assembly 230. The current is supplied through a plurality of wires 340 extending between the mounting portion 320 and a coil support 330. The coil support 330 may serve to support a coil, not shown. The current may also be supplied to another coil 350 located in the front portion 352. The coil support 330 and the actuating portion 372 may encompass a rigidly fixed magnet 344.

FIG. 5 illustrates a side view of the actuator 300 illustrated in FIG. 4. A lower bracket 314 may be located under the left bracket 316. A similar bracket, not shown, may be located under the right bracket 318 of FIG. 4. Thus, there may be four brackets extending between the mounting portion 320 and the front portion 352. The lower bracket 314 may have two hinges, not shown, that are substantially similar to the left hinges 310 illustrated in FIG. 4 on the left bracket 316. The left bracket 316 may have two additional hinges 334. Likewise, the lower bracket 314 may have two additional hinges 336. The hinges 334 and 336 may serve to allow the actuating portion 372 to move in the y-direction 140 relative to the mounting portion 320.

Referring to both FIGS. 4 and 5, the hinges 310, 312, 334, and 336 may allow the actuating portion 372 to move in both the y-direction 140 and the x-direction 150. The hinges 310, 312, 334, and 336 may also serve to bias the actuating portion 372 in a central location in the y-direction 140 and the x-direction 150. For example, the brackets 314, 316, 318 may be fabricated from a flexible material, such as nylon, that biases the actuating portion 372 to a predetermined location. The actuating portion 372 may ultimately be connected to the coil 350 and the coil, not shown, located in the coil support 330. Accordingly, the actuating portion 372 and, thus, the two-dimensional photosensor assembly 230 move proportional to the movement of the coils.

Movement of the actuating portion 372 relative to the mounting portion 320 is accomplished by creating a magnetic force between the coils and the magnet 344 in a conventional manner. More specifically, current is conducted to the coil 350 and the coil, not shown, located in the coil support 330 via the wires 340. This current causes the coils to create an electromagnetic field, which, in turn, creates a force between the coils and the magnet 344. The amount of current flowing in the coils is proportional to the amount the coils and, thus, the two-dimensional photosensor assembly 230 moves in the y-direction 140 and the x-direction 150.

Having described an exemplary actuator 300, the two-dimensional photosensor assembly 230 will now be described. Referring again to FIG. 3, the two-dimensional photosensor assembly 230 may have a top portion 240, a bottom portion 242, a left portion 244, and a right portion 246. These portions may define a surface 232 that faces opposite the actuating portion 372 of the actuator 300. The surface 232 may have a height 236, e.g., approximately one millimeter, extending between the top portion 240 and the bottom portion 242. The surface 232 may also have a length 238, e.g., approximately one millimeter, extending between the left portion 244 and the right portion 246.

The surface 232 may have a two-dimensional array of photodetectors 234 attached thereto. There may, as an example, be 15 rows and 15 columns of photodetectors 234 mounted to the surface 232. The number of photodetectors 234 in the two-dimensional array may vary depending on the application of the position sensor 200. For use within the scanning device 100, FIG. 1, however, there may be between 10 and 20 rows and between 10 and 20 columns of photodetectors 234 in the two-dimensional array. It should be noted that a typical two-dimensional photosensor assembly in a conventional position sensing device generally has 48 rows and 48 columns of photodetectors. Accordingly, the position sensing device 200 disclosed herein requires significantly fewer photodetectors 234 and, thus, costs less to produce than conventional position sensing devices. It should be noted that the photodetectors 234 depicted in FIG. 3 have been greatly enlarged for illustration purposes. In reality, the photodetectors 234 may be substantially square-shaped wherein each side has a length of approximately 0.06 millimeters.

The photodetectors 234 may output image data representative of light they receive. For example, a photodetector that receives a relatively high intensity of light may output a relatively high data value, e.g., a relatively high voltage. Likewise, a photodetector 234 that receives a relatively low intensity of light may output a relatively low data value, e.g., a relatively low voltage. The cumulation of image data output from the photodetectors 234 and, thus, the two-dimensional photosensor assembly 230, represents an image focused onto the photodetectors 234. As will be described in greater detail below, a section of the area portion 190, FIG. 1, of the surface 182 will be focused onto the photodetectors 234. Thus, the image data output by the two-dimensional photosensor assembly 230 will be representative of an image of a section of the area portion 190.

Figure 6:
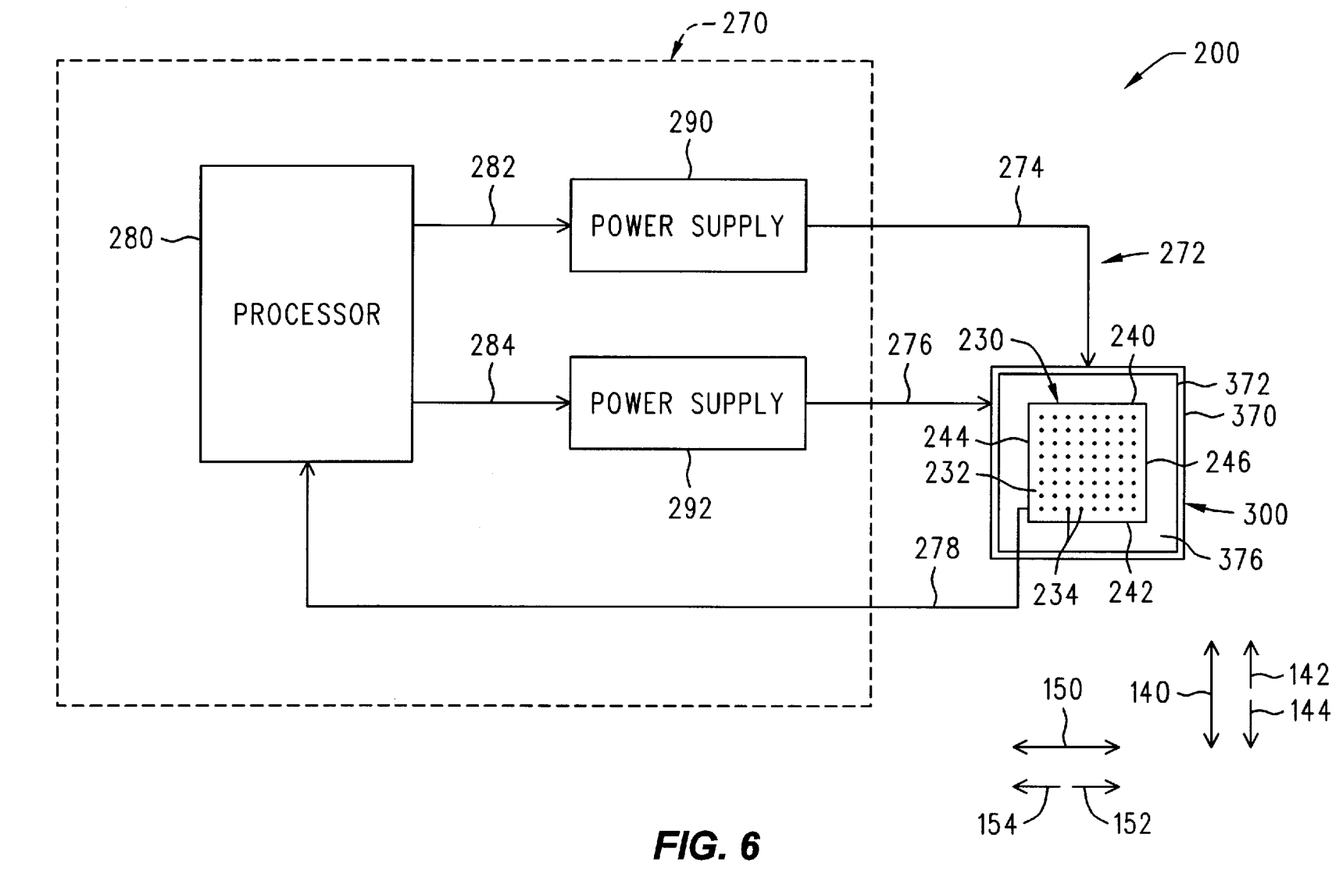
FIG. 6 is a schematic illustration of a processor associated with the position sensing device of FIG. 1.

Referring again to FIG. 1, the two-dimensional photosensor assembly 230 may be electrically connected to the substrate 210 via a data cable, not shown. The substrate 210, in turn, may be electrically connected to the processor 270 by a data line 272. The two-dimensional photosensor assembly 230 may ultimately be electrically connected to the processor 270 by way of the data line 272, the lands on the substrate 210 and the data cable between the two-dimensional photosensor assembly 230 and the substrate 210. Likewise, the actuator 300 may ultimately be electrically connected to the processor 270 via the data line 272 and the lands on the substrate 210. detailed schematic illustration of the processor 270 and its association with the actuator 300 and two-dimensional photosensor assembly 230 is shown in FIG. 6. The processor 270 may comprise a processing unit 280, an x-direction power supply 290, and a y-direction power supply 292. A data line 282 may electrically connect the processing unit 280 to the x-direction power supply 290. A data line 284 may electrically connect the processing unit 280 to the y-direction power supply 292. The data line 272 may be the cumulation of three data lines 274, 276, and 278 and may, as an example, be a ribbon-type data cable. The data line 274 may electrically connect the x-direction power supply 290 to the control portion 370 of the actuator 300. The data line 276 may electrically connect the y-direction power supply 292 to the control portion 370 of the actuator 300. The data line 278 may ultimately electrically connect the two-dimensional photosensor assembly 230 to the processing unit 280.

The processor 280 may serve to process image data generated by the two-dimensional photosensor assembly 230 in a conventional manner. The processing unit 280 may also serve to instruct the control portion 370 of the actuator 300 as where to move the actuating portion 372 and, thus, the two-dimensional photosensor assembly 230. Specifically, the processing unit 280 may output an instruction to the x-direction power supply 290 via the data line 282 instructing the x-direction power supply 290 to output a specified voltage. This specified voltage output by the x-direction power supply 290 may cause the control portion 370 of the actuator 300 to move the actuating portion 372 and, thus, the two-dimensional photosensor assembly 230 to a specified position in the x-direction 150. Likewise, the processing unit 280 may output an instruction to the y-direction power supply 292 via the data line 284 instructing the y-direction power supply 292 to output a specified voltage. This specified voltage output by the y-direction power supply 292 may cause the control portion 370 to move the actuating portion 372 and, thus, the two-dimensional photosensor assembly 230, to a specified position in the y-direction 140.

Having described the components comprising the position sensing device 200 incorporated into the scanning device 100, the operation of the position sensing device 200 and the scanning device 100 will now be described in detail.

In summary, the position sensing device 200 tracks distinct features on the surface 182 of the sheet of paper 180 as the scanning device 100 is moved relative to the surface 182. The tracking is accomplished with an electronic component and a mechanical component. The electronic component of the tracking involves the processor 270 determining the locations of distinct features on the surface 182 relative to the two-dimensional photosensor assembly 230. As the scanning device 100 moves relative to the surface 182, the distinct features move relative to the two-dimensional photosensor assembly 230. The processor 270 is able to determine the location of the scanning device 100 relative to the surface 182 by determining the locations of the distinct features relative to the two-dimensional photosensor assembly 230.

The mechanical component of the tracking involves moving the two-dimensional photosensor assembly 230 with the actuator 300 to physically track the distinct features in the surface 182. The processor 270 controls the movement of the two-dimensional photosensor assembly 230 by controlling the actuator 300. Accordingly, the processor 270 knows the position of the two-dimensional photosensor assembly 230 relative to the scanning device 100 as the two-dimensional photosensor assembly 230 is moved by the actuator 300. The processor 270 is, thus, able to determine the position of the scanning device 100 relative to the surface 182 by determining the amount of movement the two-dimensional photosensor assembly 230 is required to move in order to track the distinct features.

The results from both the electronic component and the mechanical component of the tracking are used to accurately determine the position of the scanning device 100 relative to the surface 182. In summary, the processor 270 determines the movement of the two-dimensional photosensor assembly 230 and the movement of the distinct features relative to the two-dimensional photosensor assembly 230 to determine the movement of the scanning device 100 relative to the surface 182. By obtaining tracking information from these two sources, the processor 270 is able to accurately determine the position of the scanning device 100 relative to the surface 182. Accordingly, the relatively small two-dimensional photosensor assembly 230 is moved relative to the surface 182 to track the distinct features. This is significantly different than conventional position sensors, which have a relatively large two-dimensional photosensor assembly fixed therein. By moving the two-dimensional photosensor assembly 230, as described herein, the relatively small two-dimensional photosensor assembly 230 functions as a larger two-dimensional photosensor assembly as used in a conventional position sensing device. Specifically, the moving two-dimensional photosensor assembly 230 is able to image a large area of the surface 182 for positioning purposes.

Figure 7A:
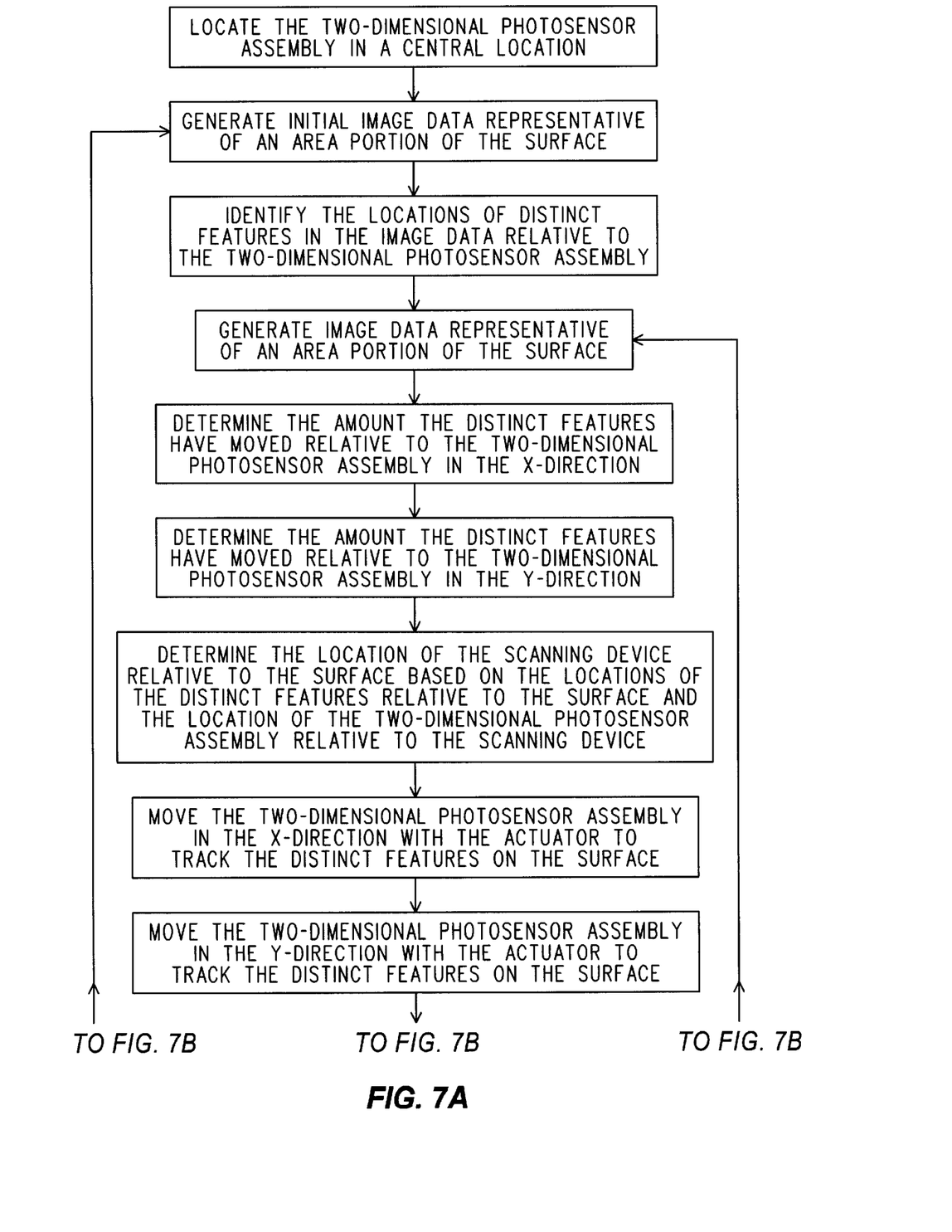
FIGS. 7A and 7B illustrate a flow chart describing the operation of the position sensing device of FIG. 1.
Figure 7B:
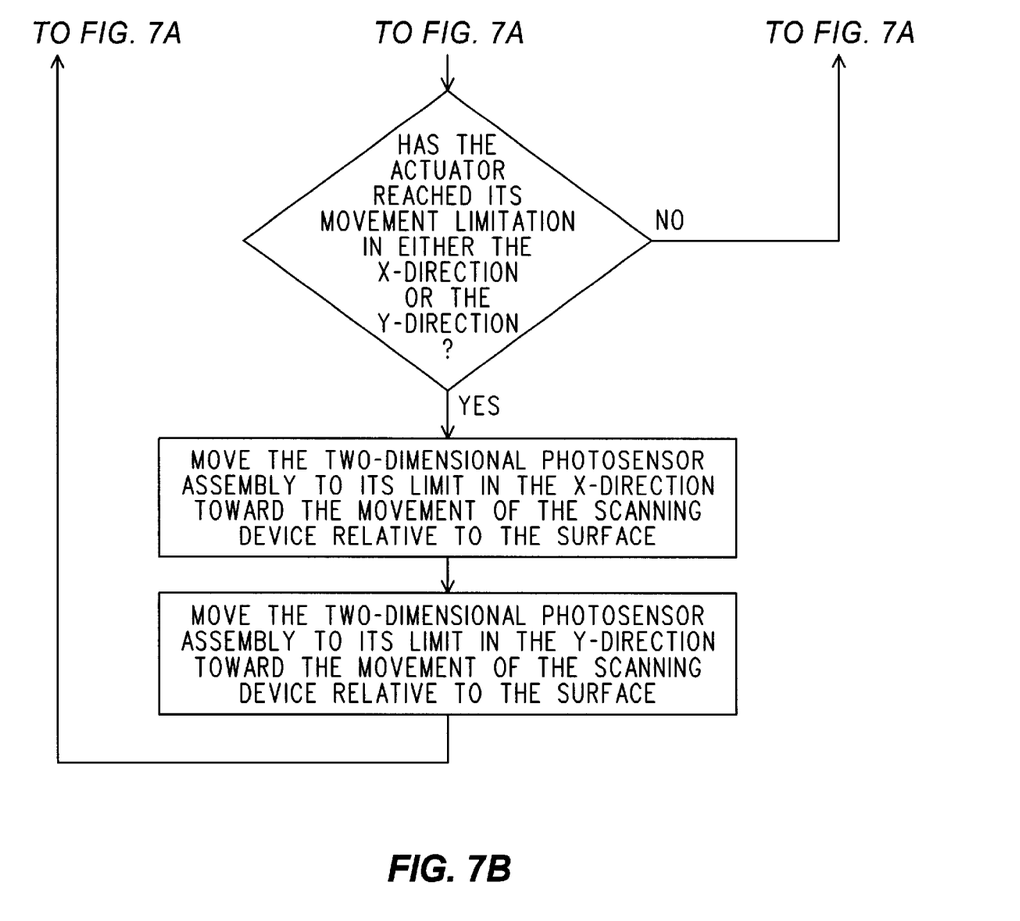

Having summarily described the operation of the position sensing device 200 incorporated into the scanning device 100, they will both now be described in detail. A description of the operation of the position sensor 200 is also illustrated in the flow chart of FIG. 7.

Referring to FIG. 2, the scanning device 100 follows a path 176 on the surface 182 of the sheet of paper 180 in order to generate image data representative of the text 178 printed on the surface 182 of the sheet of paper 180. The path 176 is caused by a user manually moving the scanning device 100 across the surface 182 of the sheet of paper 180. The image data generated by the scanning device 100 is in the form of a plurality of scan line portions skewed over the surface 182 of the sheet of paper. As the scanning device 100 is moved across the surface 182, the position sensing device 200, FIG. 1, determines the position of the scanning device 100 relative to the surface 182. The scan line portions are electronically tagged with the position of the scanner 100 as the image data is being generated. When the image of the text 178 printed on the surface 182 is replicated, the scanning device 100 uses the position information to electronically place the scan line portions relative to each other.

Referring to FIG. 3, prior to the commencement of the scanning operation, the actuator 300 biases the two-dimensional photosensor assembly 230 to central locations in the y-direction 140 and the x-direction 150. For example, spring forces may cause the two-dimensional photosensor assembly 230 to move to this central position. During this period, neither the x-direction power supply 290, FIG. 6, nor the y-direction power supply 292 output voltages to the control portion 370 of the actuator 300.

Referring to FIG. 1, upon commencement of the scanning operation, the light source 194 emits a beam of light that follows the incident light path 196 through the aperture 116 in the housing 110 to the area portion 190 of the surface 182. Accordingly, the area portion 190 between the first point 186 and the second point 188 is illuminated. Light representing an image of a section of the area portion 190 reflects from the area portion 190, passes through the aperture 116, and is focused by the lens 250 onto the two-dimensional photosensor assembly 230. The surface 182 of the sheet of paper 180 has distinct features that appear as light/dark contrasts on the two-dimensional photosensor assembly 230. For example pits and rises inherent in pulp material such as paper will appear as light/dark contrasts. These light/dark contrasts are focused onto the two-dimensional photosensor assembly 230 and converted to image data. It should be noted that the entire area portion 190 need not be focused onto the two-dimensional photosensor assembly 230. The mechanical component of the tracking will move the two-dimensional photosensor assembly 230 to focus various sections of the area portion 190 onto the two-dimensional photosensor assembly 230.

Referring to FIG. 6, the photodetectors 234 on the surface 232 of the two-dimensional photosensor assembly 230 generate image data representative of the image of the area portion 190, FIG. 1. More specifically, the photodetectors 234 generate image data representative of the section of the area portion 190 that is focused onto the two-dimensional photosensor assembly 234 by the lens 250. The image data includes images of the distinct features on the surface 182 of the sheet of paper 180. The image data is output from the two-dimensional photosensor assembly 230 to the processing unit 280 in the processor 270 via the data line 278. The processing unit 280 identifies the above-described distinct features in the image data. The processing unit 280 also identifies the locations where the distinct features appear on the two-dimensional photosensor assembly 230. For example, the processing unit 280 may identify which photodetectors 234 imaged the distinct features. This identification of the distinct features results in the processing unit 280 having a data base of the locations of the distinct features relative to the two-dimensional photosensor assembly 230.

As the scanning device 100, FIG. 1 moves relative to the surface 182 of the sheet of paper 180, the distinct features move relative to the photodetectors 234, FIG. 6, and thus, relative to the two-dimensional photosensor assembly 230. For example, if the scanning device 100, FIG. 1, moves in the negative x-direction 154 and negative y-direction 144, FIG. 6, relative to the surface 182, the distinct features will move in the positive x-direction 152 and the positive y-direction 142 relative to the surface 232 of the two-dimensional photosensor assembly 230. Accordingly, the images of the distinct features will move from the left portion 244 of the two-dimensional photosensor assembly 230 toward the right portion 246. The images of the distinct features will also move from the bottom portion 242 of the two-dimensional photosensor assembly 230 toward the top portion 240.

The processing unit 280 determines the distance the scanning device 100, FIG. 1, has traveled over a period relative to the surface 182 by measuring the distance the distinct features have moved relative to the surface 232 of the two-dimensional photosensor assembly 230. The processing unit 280 is also able to determine the direction of movement of the scanning device 100 relative to the surface 182 by determining the direction of movement of the photodetectors 234 relative to the two-dimensional photosensor assembly 230. Examples of determining the movement of a device by imaging distinct features of the surface of an object are further described in the following United States patents: U.S. Pat. No. 5,644,139 of Allen et al. and U.S. Pat. No. 5,578,813 of Allen et al., both of which have been previously referenced.

Referring to FIG. 6, due to the relatively small size of the two-dimensional photosensor assembly 230, the distinct features will quickly pass by the two-dimensional photosensor assembly 230. This diminishes the ability of the position sensing device 200 to use the image data alone to accurately determine the position of the scanning device 100, FIG. 1, relative to the surface 182 of the sheet of paper 180. In order to overcome this problem, the position sensing device 200 physically moves the two-dimensional photosensor assembly 230 to track the distinct features. This is sometimes referred to herein as the mechanical component of the tracking. In the example described above, the images of the distinct features are moving toward the top portion 240 and the right portion 246 of the two-dimensional photosensor assembly 230. Accordingly, the two-dimensional photosensor assembly 230 has to move in the positive y-direction 142 and the positive x-direction 152 in order to continue tracking the distinct features or they will quickly move beyond the imaging range of the two-dimensional photosensor assembly 230.

In order to track the distinct features in the y-direction 140, the processing unit 280 first calculates the amount the two-dimensional photosensor assembly 230 must move in the positive y-direction 142. The processing unit 280 then calculates a voltage that must be applied via the data line 276 to the control portion 370 to achieve the desired movement in the positive y-direction 142. The processing unit 280 then transmits an instruction to the y-direction power supply 292 via the data line 284 instructing the y-direction power supply 292 to output this voltage on the data line 276. Accordingly, the control portion 370 of the actuator 300 moves the two-dimensional photosensor assembly 230 the desired amount in the positive y-direction 142.

Virtually the same process is performed by the processing unit 280 and the x-direction power supply 290 to move the two-dimensional photosensor assembly 230 a desired amount in the positive x-direction 152. The processing unit 280 transmits an instruction via the data line 282 instructing the x-direction power supply 290 to output a specified voltage on the data line 274. Accordingly, the control portion 370 of the actuator 300 moves the two-dimensional photosensor assembly 230 the desired amount in the positive x-direction 152 to track the distinct features in the x-direction 150. The process of moving the two-dimensional photosensor assembly 230 in minute steps is sometimes referred to as micro stepping.

When the actuator 300 has moved the two-dimensional photosensor assembly 230 as far as possible in any direction, it moves in the opposite direction and the processing unit 280 acquires new distinct features to track. This process is sometimes referred to as macro stepping. For example, in the example described above, the actuator 300 will eventually move the two-dimensional photosensor assembly 230 as far as it is able to go in either the positive y-direction 142 or the positive x-direction 152. When the actuator 300 has reached its maximum travel in the positive y-direction 142, the processing unit 280 instructs the actuator 300 to move the two-dimensional photosensor assembly 230 as far as possible in the negative y-direction 144. This is achieved by transmitting an instruction to the y-direction power supply 292 instructing it to output a voltage on the data line 276 that will move the two-dimensional photosensor assembly 230 as far as possible in the negative y-direction 144. As the scanning device 100, FIG. 1, continues to move in the negative y-direction 144, the repositioning of the two-dimensional photosensor assembly 230 will allow it to track the distinct features over the full range of movement of the actuator 300 in the y-direction 140. The actuator 300 may simultaneously move the two-dimensional photosensor assembly 230 in the negative x-direction 154 as far as it will go. This tends to improve the efficiency of the position sensor 200 because the two-dimensional photosensor assembly 230 will eventually have to be moved as far as it can go in the negative x-direction 154 and acquire images of new distinct features. When the two-dimensional photosensor assembly 230 is moved in both the negative y-direction 144 and the negative x-direction 154, the two-dimensional photosensor assembly 230 needs only to acquire the distinct features one time.

The processing unit 280 keeps track of the location of the two-dimensional photosensor assembly 230 relative to the scanning device 100, FIG. 1, as it tracks the distinct features. The location of the two-dimensional photosensor assembly 230 is used by the processing unit 280 to determine the location of the scanning device 100, FIG. 1, relative to the surface 182 of the sheet of paper 180. For example, if the two-dimensional photosensor assembly 230 has moved one millimeter in the positive y-direction 142 and one millimeter in the positive x-direction 152 from its central location, the processing unit 280 will use this movement for the final calculation of the position of the scanning device 100, FIG. 1, relative to the surface 182. For example, the processing unit 280 may first determine the position of the scanning device 100, FIG. 1, based on the locations of the distinct features relative to the two-dimensional photosensor assembly 230. This position may be offset by the movement of the actuator 300, which is one millimeter in both directions in the example described above. Accordingly, the processor 270 is able to accurately determine the position of the scanning device 100 relative to the surface with the use of a two-dimensional photosensor assembly 230 that has a relatively small area.

The actuator 300 may, as an example, have a piezoelectric actuating mechanism located between the control portion 370 and the actuating portion 372. For example, conventional piezoceramic elements may be attached between the control portion 370 and the lever mechanism 374, which move the lever mechanism 374 and, thus, the actuating portion 372 upon application of a voltage. Alternatively, the lever mechanism 374, may be moved relative to the control portion 370 by the use of magnetic forces. For example magnetic actuators commonly used to track data on compact discs may be employed to move the lever mechanism 374.

In an embodiment of the position sensing device 200, the lens 250 may be affixed to the actuating portion 372 of the actuator 300. In this embodiment, the lens 250 moves along with the two-dimensional photosensor assembly 230. In some applications of the position sensing device 200, this embodiment may be preferred because the light path 260 will tend to remain in a constant position relative to the two-dimensional photosensor assembly 230 and the lens 250 as the two-dimensional photosensor assembly 230 and the lens 250 move. Accordingly, the distinct features on the surface 182 will remain in focus as the two-dimensional photosensing device 230 moves relative to the surface.

Having described an embodiment of the position sensing device 200 with a movable two-dimensional photosensor assembly 230, another embodiment of the position sensing device 200 illustrated in FIGS. 6 and 7 will now be described.

The embodiment of the position sensing device 200 illustrated in FIGS. 6 and 7 has a fixed two-dimensional photosensor assembly 230 and a movable lens 250. In this embodiment, the two-dimensional photosensor assembly 230 may be affixed to the substrate 210 in a conventional manner, i.e., it may be soldered or placed in a socket. An actuator 400 with a horizontally extending lever portion 420 may be substituted for the actuator 300 described above.

Figure 9:
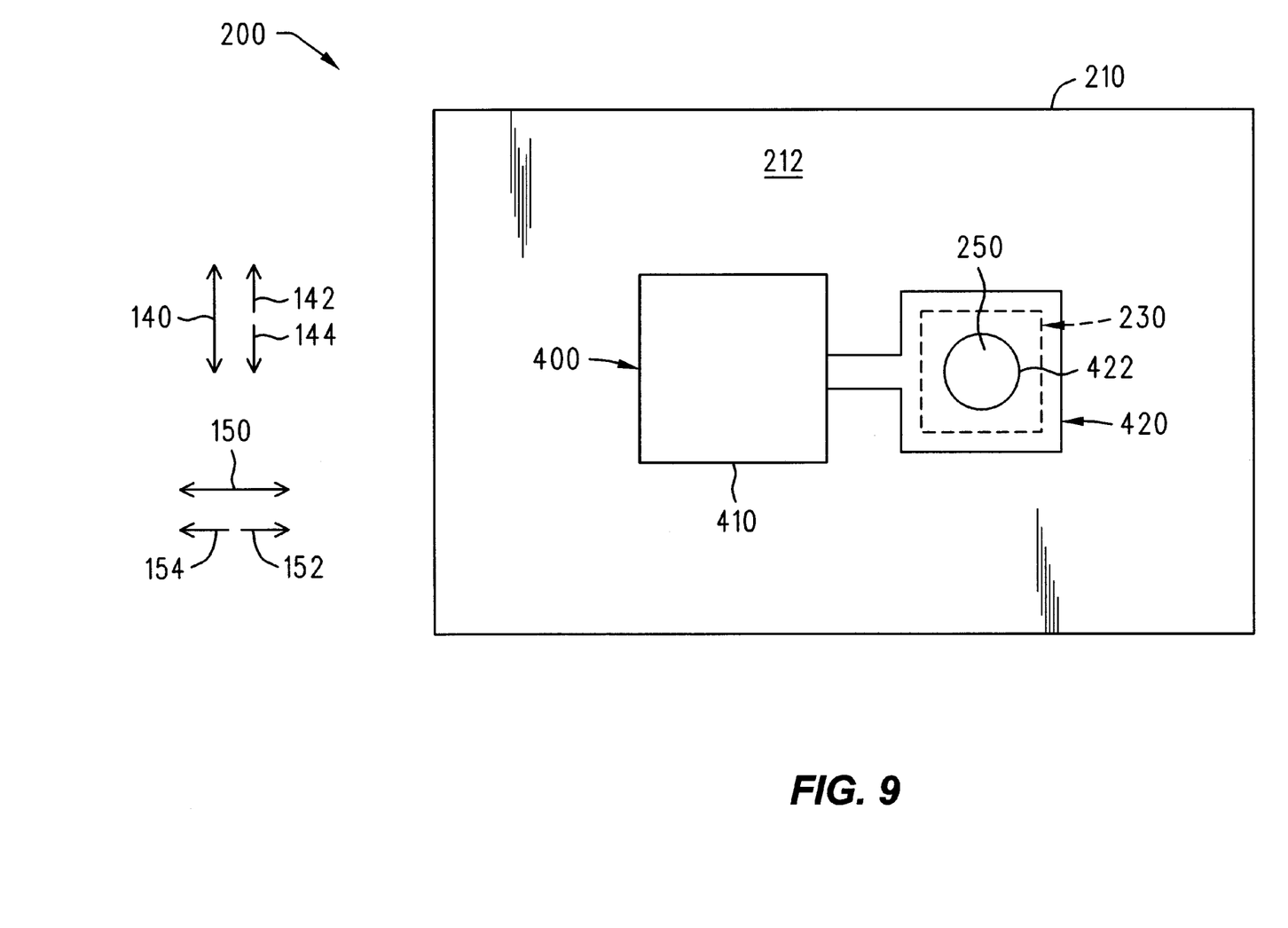
FIG. 9 is a top view of the position sensing device of FIG. 8.

Referring to FIG. 9, the actuator 400 may have a control mechanism 410 and a lever mechanism 420, which are sometimes referred to herein as a first portion and a second portion respectively. The lever mechanism 420 may have a hole 422 formed therein that is appropriately sized to secure the lens 250. The control mechanism 410 may be electrically connected and mechanically attached to the surface 212 of the substrate 210 in the proximity of the two-dimensional photosensor assembly 230. The hole 422 in the lever 420 may extend over the two-dimensional photosensor assembly 230 so that light may be focused by the lens 250 onto the two-dimensional photosensor assembly 230. The control mechanism 410 may serve to move the lever mechanism 420 in the y-direction 140 and the x-direction 150 in a similar manner as the control portion 370, FIG. 6, moves the actuating portion 372. The position sensor 200 tracks the distinct features by moving the lens 250 so as to direct the light path 260 between the distinct features and the two-dimensional photosensor assembly 230.

The embodiment of the position sensing device 200 illustrated in FIG. 8 functions is a manner that is substantially similar to the embodiment of the position sensing device 200 illustrated in FIG. 1. The control mechanism 410 in the actuator 400, however, moves the lens 250 rather than the two-dimensional photosensor assembly 230 in order to track distinct features on the surface 182 of the sheet of paper 180. By moving the lens 250, the light path 260 will be offset from the focal axis of the lens 250, which bends the light path 260 at the lens 250. The control mechanism 410 continually moves the lever mechanism 420 to direct light from the distinct features to the two-dimensional photosensor assembly 230. An example of offsetting the focal axis of a lens from a light path in order to direct the light path to a target is disclosed in United States patent application, Ser. No. 09/290,842 of Gardner for OPTICAL ASSEMBLY HAVING LENS OFFSET FROM OPTICAL AXIS, filed on Apr. 13, 1999, which is hereby incorporated by reference for all that is disclosed therein.

In this embodiment of the position sensing device 200, the electronic component of the tracking is substantially similar to the electronic component of the tracking described above with reference to FIG. 1. The mechanical component of the tracking is achieved by moving the lens 250 relative to the two-dimensional photosensor assembly 230. The processor 270 instructs the actuator 400 to move the lens 250 to track the distinct features on the surface 182. The actual amount and direction of the movement of the lens 250 depends on the optical characteristics of the scanning device 100 with the lens 250 incorporated therein.

The actuators 300 and 400 have been described herein as being limited to moving in the y-direction 140 and the x-direction 150. In an embodiment of the position sensing device 200, the actuators 300 and 400 also move in a z-direction 160, FIGS. 1 and 6, wherein the z-direction 160 has a positive z-direction 162 and a negative z-direction 164. The z-direction 160 may be substantially normal to a plane defined by the y-direction 140 and the x-direction 150. This movement in the z-direction 160 moves the two-dimensional photosensor assembly 230 relative to the lens 250. This movement in the z-direction 160 is used to focus an image of the surface 182 onto the two-dimensional photosensor assembly 230. This allows a more defined image of the distinct features to be focused onto the two-dimensional photosensor assembly 230, which, in turn, improves the accuracy to which the position sensing device 200 determines the position of the scanning device 100 relative to the surface 182.

It should be noted that the scanning device 100 may have to be calibrated to compensate for the amount of distortion in the lens 250. The distortion is an optical aberration that may cause the scanning device 100 to erroneously locate the distinct features relative to the two-dimensional photosensor assembly 230. Accordingly, the above-described movement of either the lens 250 or the two-dimensional photosensor assembly 230 may have to be compensated for the distortion of the lens 250.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of determining the position of an object relative to a surface, said method comprising:

providing a two-dimensional photosensor array associated with said object;

providing a lens associated with said object;

directing light from a focal plane portion of said surface, through said lens, and onto said two-dimensional photosensor array;

causing relative movement between said surface and object;

maintaining a light path between said focal plane portion of said surface and said two-dimensional photosensor array by moving said lens relative to two-dimensional photosensor array; and performing an analysis of said movement of said lens relative to said two-dimensional photosensor array to determine the displacement of said object relative to said surface.

2. The method of claim 1 further comprising generating image data representative of said focal plane portion of said surface with said two-dimensional photosensor array, wherein said performing an analysis comprises performing an analysis of said movement of said lens relative to said two-dimensional photosensor array and said image data to determine the displacement of said object relative to said surface.

3. The method of claim 1 wherein said providing a two-dimensional photosensor array comprises providing a two-dimensional photosensor array fixedly associated with said object.

4. The method of claim 1 wherein said providing a lens comprises providing a lens fixedly associated with said object.

* * * * *